United States Patent [19]

Ehara et al.

[11] Patent Number: 5,053,268
[45] Date of Patent: Oct. 1, 1991

[54] COMPOSITE PAPER

[75] Inventors: Ryohei Ehara, Saitama; Masatoshi Tomiki, Koshigaya, both of Japan

[73] Assignee: Somar Corporation, Japan

[21] Appl. No.: 442,294

[22] Filed: Nov. 28, 1989

[30] Foreign Application Priority Data

Dec. 1, 1988 [JP] Japan ................... 63-305054

[51] Int. Cl.$^5$ ............... B32B 27/10; B32B 27/28
[52] U.S. Cl. ................... 428/215; 428/425.1; 428/412; 428/414; 428/424.4; 428/424.6; 428/423.7; 428/423.5; 428/425.3; 428/473.5; 428/483; 428/476.9; 428/514; 428/511; 156/238; 156/241
[58] Field of Search ............. 428/513, 514, 215, 425.4

[56] References Cited

FOREIGN PATENT DOCUMENTS 2324862 12/1974 Fed. Rep. of Germany ...... 428/513

*Primary Examiner*—P. C. Sluby
*Attorney, Agent, or Firm*—Lorusso & Loud

[57] ABSTRACT

A composite paper suitable for use as writing paper, printing paper or copying paper is disclosed which includes a synthetic resin film having a thickness of 12–30 μm, and a paper sheet laminated on each side of the synthetic resin film and having a Bekk smoothness of 60–120 seconds, a density of 0.8–1.0 g/cm$^3$, a degree of sizing of 0.5–1.5 seconds and a thickness of 20–25 μm.

2 Claims, No Drawings

COMPOSITE PAPER

BACKGROUND OF THE INVENTION

This invention relates to a composite paper having excellent writability, printability and recordability.

A composite paper composed of a synthetic resin film and a paper sheet bonded to each of the surface of the film is known to be usable as writing paper, recording paper, printing paper or a copying paper (Japanese Published Unexamined Patent Application No. 56-84954). Known composite papers have problems because (1) papers spontaneously curl, (2) writing inks tend to blur, (3) writability with pencils, especially hard pencils, is not satisfactory and (4) patterns written with pencils are not easily erased with a rubber eraser.

BRIEF SUMMARY OF THE INVENTION

It is, therefore, an object of the present invention to provide a composite paper in which the above-mentioned problems of conventional papers have been overcome.

Another object of the present invention is to provide a composite paper which is useful for writing, recording, printing or copying purposes, which causes no curls, which is not blurred when written with inks and which has excellent pencil take property and erasability.

In accomplishing the foregoing objects, the present invention provides an improved composite paper which comprises a synthetic resin film, and a paper sheet laminated on each side of said synthetic resin film. The improvement includes the paper sheet which has a Bekk smoothness of 60–120 seconds, a density of 0.8–1.0 g/cm$^3$, a degree of sizing of 0.5–1.5 seconds and a thickness of 20–25 μm.

By the term "Bekk smoothness" used in the present specification is meant smoothness measured in accordance with a method specified in JIS (Japanese Industrial Standard) P8119 using a Bekk smoothness tester.

By the term "degree of sizing" used in the present specification is meant a sizing degree measured in accordance with a method specified in JIS P8122.

Other objects, features and advantages of the present invention will become apparent from the detailed description of the invention to follow.

DETAILED DESCRIPTION OF THE INVENTION

The composite paper according to the present invention is a three layered laminate composed of a synthetic resin film serving as a substrate, and two paper sheets sandwiching the synthetic resin film.

The synthetic resin film has a thickness of 12–30 μm, preferably 16–24 μm and may be formed of, for example, a polyvinyl chloride resin, a polyethylene resin, a polypropylene resin, a polystyrene resin, a polyamide resin, a polyester resin, a polycarbonate resin, a polyimide resin or the like synthetic polymeric material.

The paper sheet which is laminated on each side of the synthetic resin film should have a Bekk smoothness of 60–120 seconds, a density of 0.8–1.0 g/cm$^3$, a degree of sizing of 0.5–1.5 seconds and a thickness of 20–25 μm. Su not been hitherto used as a tracing paper.

A Bekk smoothness of the paper sheet below 60 seconds is disadvantageous because the pencil take property of the composite paper becomes poor. Too high a Bekk smoothness in excess of 120 seconds fails to give pencil patterns with smooth lines. A degree of sizing outside of the above-specified range fails to give clear ink patterns without blurs. Preferably, the paper sheet has a Beck smoothness of 80–100 seconds, a density of 0.82–0.90 g/cm$^3$, a degree of sizing of 0.9–1 second and a thickness of 22–24 μm.

The lamination of the paper sheets on both sides of the synthetic resin film may be effected with an adhesive, preferably a curable adhesive such as a phenol-type, epoxy-type, acrylic-type or urethane-type adhesive. The urethane-type adhesive which is, for example, a composition including a polyester polyol or an acrylated polyol, and a polyisocyanate, is especially preferably used for the purpose of the present invention since it affords suitable water-proofing property and bonding strength. Either two-pack type or one-pack type urethane-type adhesive may be used.

Because of its excellent writability and printability and freeness of causing curls and of ink blurs, the composite paper according to the present invention is suitably used as a tracing paper for drafting, as a recording paper for measuring instruments or printers and as a copying paper for xerographic machines.

The following examples will further illustrate the present invention.

EXAMPLE 1

A polyester film (thickness: 16 μm, haze: below 4%) was laminated, on its both sides, with paper sheets each having a thickness of 23 μm, a basis weight of 21.5 g/m$^2$, a density of 0.88 g/cm$^3$, a moisture content of below 7%, a degree of sizing of 0.9 second and Bekk smoothness of 80 seconds (front surface side) and 100 seconds (backside to be contacted with the polyester film through an adhesive). An two-pack type urethane adhesive was applied on both sides of the polyester film to such a thickness that the amount of each adhesive layer is 3.5 g/m$^2$ on dry basis. The paper sheets were then superposed on the adhesive layers with each backside surface contacting the corresponding adhesive layer. The resulting laminate was allowed to stand at 35° C. for 4 days. In the same manner as described above, laminated papers were prepared using paper sheets having various Bekk smoothness (front surface side) of 60–120 seconds.

COMPARATIVE EXAMPLE 1

Example 1 was repeated in the same manner as described except that paper sheets used had Beck smoothness of 50–55 seconds (front surface side) and 60–70 seconds (backside).

COMPARATIVE EXAMPLE 2

Example 1 was repeated in the same manner as described except that paper sheets used had Bekk smoothness of 125–140 seconds (front surface side) and 130–150 seconds (backside).

The thus obtained composite papers were tested for curling tendency and writability. The test methods are as follows:

Tendency to Curl

A sample cut into a A4-size is allowed to stand on a flat horizontal table at 20° C. under a relative humidity of 60% for 1 hour. Thereafter, the height of each of the both ends of the paper is measured. When the height is less than 2 cm, curling tendency is evaluated to be small.

Writability (1) With fountain pen and ball-point pen

Written patterns are observed by a magnifying glass to check blurs, fluctuation of line width and breakage of lines. The writability is rated in three ranks of excellent, good and poor on the basis of total evaluation of the results of the above observation.

(2) With pencil

Patterns are written with a pencil (hardness: HB) while checking smoothness of writing. The written patterns are erased with a rubber eraser to check erasability. The writability is rated in three ranks of excellent, good and poor on the basis of total evaluation of the results of the above check.

The test results are summarized in Table 1 below.

TABLE 1

|  | Curling Tendency | Writability | | |
|---|---|---|---|---|
|  |  | Fountain pen | Ball point pen | Pencil |
| Example 1 | small | excellent | excellent | excellent |
| Comp. Ex. 1 | small | poor | excellent | poor |
| Comp. Ex. 2 | small | good | excellent | good |

We claim:

1. A composite paper comprising a synthetic resin film having a thickness of 16–24 $\mu$m, and a sheet of paper laminated on each side of said synthetic resin film and having a Bekk smoothness of 80–100 seconds, a density of 0.82–0.90 g/cm$^3$, a degree of sizing of 0.9–1 second and a thickness of 22–24 $\mu$m.

2. A composite paper as claimed in claim 1, wherein each of the paper sheets if bonded to the synthetic resin film with an urethane adhesive.

* * * * *

UNITED STATES PATENT AND TRADEMARK OFFICE
CERTIFICATE OF CORRECTION

PATENT NO. : 5,053,268
DATED : October 1, 1991
INVENTOR(S) : EHARA et al

It is certified that error appears in the above-identified patent and that said Letters Patent is hereby corrected as shown below:

Column 1, line 64, "Su" should read --Such a paper sheet has--.

IN THE CLAIMS:

Column 4, line 18, "if" should read --is--.

Signed and Sealed this

Eleventh Day of May, 1993

Attest:

MICHAEL K. KIRK

Attesting Officer

Acting Commissioner of Patents and Trademarks